Patented Sept. 30, 1924.

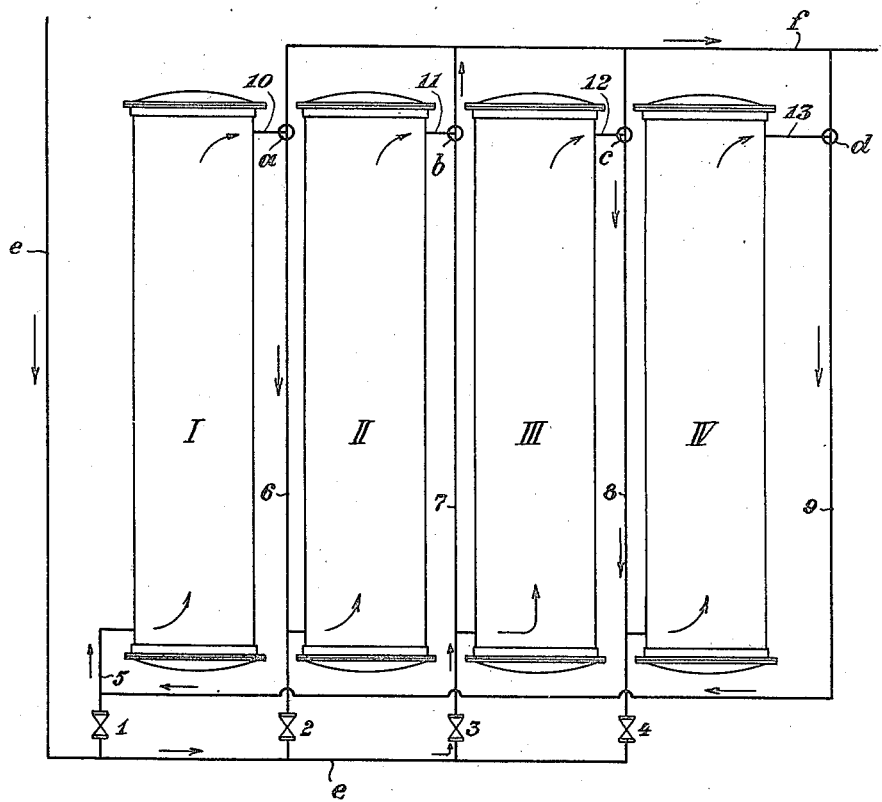

1,510,195

UNITED STATES PATENT OFFICE.

ADOLF RÖMER, OF STUTTGART, GERMANY, ASSIGNOR TO DEUTSCH-KOLONIALE GERB- & FARBSTOFF-GESELLSCHAFT M. B. H., OF KARLSRUHE, GERMANY, A SOCIETY OF GERMANY.

FERMENTATION PROCESS.

Application filed August 27, 1919. Serial No. 320,262.

*To all whom it may concern:*

Be it known that I, ADOLF RÖMER, a German subject, and resident of Stuttgart, Germany, have invented certain new and useful Improvements in Fermentation Processes (for which I have filed foreign applications as follows:

Germany, filed Aug. 26, 1916, granted Sept. 20, 1921, Patent No. 340,904; Germany, filed Sept. 5, 1918, granted Feb. 4, 1922, Patent No. 348,285; Germany, filed Jan. 20, 1919, granted Dec. 30, 1921, Patent No. 346,460; Germany, filed Apr. 25, 1919, granted Feb. 4, 1922, Patent No. 348,286; England, filed June 17, 1920, accepted Apr. 21, 1921, Patent No. 161,870; France, filed Dec. 21, 1918, published June 16, 1921, Patent No. 519,815; France, filed July 9, 1920, published Oct. 18, 1921, Patent No. 23248/519815; Belgium, filed July 8, 1920, granted Aug. 14, 1920, Patent No. 289,946; Canada, filed Dec. 4, 1920, granted Feb. 21, 1922, Patent No. 215,999; Denmark, filed July 17, 1920, granted Feb. 8, 1922, Patent No. 29,357; Norway, filed Dec. 27, 1918, granted Sept. 20, 1920, Patent No. 31,035; Norway, filed June 30, 1920, granted Jan. 2, 1923, Patent No. 36,423; Switzerland, filed Dec. 5, 1918, granted Dec. 1, 1920, Patent No. 81,614; Switzerland, filed July 7, 1920, granted Jan. 16, 1922, Patent No. 92,577; Hungary, filed July 23, 1917, granted July 10, 1918, Patent No. 72,292: Hungary, filed Aug. 25, 1920, patent of addition, number unknown; Finland, filed Aug. 6, 1920, granted Sept. 15, 1922, Patent No. 9,158; Holland, filed June 29, 1920, no patent granted; Austria, filed June 28, 1920, no patent granted; Poland, filed June 23, 1920, three applications, no patent granted; Sweden, filed Dec. 7, 1918, no patent granted; Sweden, filed June 30, 1920, no patent granted; Yugoslavia, filed Mar. 29, 1921, no patent granted; Yugoslavia, filed Dec. 10, 1921, no patent granted; Hungary, filed Mar. 25, 1921, no patent granted; Czechoslovakia, filed July 19, 1922, no patent granted; Czechoslovakia, July 7, 1920, no patent granted; Serb-Croat-Slovene State, filed Mar. 29, 1921, filed Dec. 10, 1921, no patent granted), of which the following is a specification.

My present invention relates to a process of fermenting sugar solutions obtained from cellulose which for that purpose has been split up either artificially or naturally.

It is a well known fact that by treating saw dust or the like, with certain acids, such, for instance, as sulfurous acid, or sulfuric acid, at an increased temperature and with application of pressure, the cellulose can be split up while sugar is formed. Sugar thus produced is found, for instance, in the waste lye of sulphite cellulose. The water removed from peat by a pressing action contains a certain proportion of sugar the presence of which may be accounted for by a natural splitting up of the cellulose.

Attempts have been made to utilize the sugar thus produced for the production of alcohol. No really satisfactory results could be obtained so that the problem of producing spirit from wood is still in its initial stage.

In solving this problem, a serious difficulty is encountered in the fermentation of the sugar solution. When cellulose is being split up, there are produced, besides sugar, various by-products of an undesirable character with regard to the fermentation process, such by-products, for instance, which exert a checking action upon the fermentation. It is a well known fact that in decomposing saw dust by means of acids under pressure, a prolonged treatment, is a disadvantage since the fermentation of the sugar thus obtained proceeds especially unsatisfactorily This fact can but be explained by assuming that during the prolonged action there are formed products which naturally tend to impede the fermentation process and, hence, influence the latter unfavorably. This prolonged treatment is however unavoidable when working in a large autoclave, owing to the necessity of heating the comparatively large quantity of material that is to be subjected to reaction.

Hitherto, efforts have been made to meet these drawbacks by aiming at the production of a better fermenting sugar solution by shortening the duration of the decomposition process of the cellulose. The object of my present invention is to conduct the fermentation process in such a manner that thereby a good and sufficient fermentation of the sugar obtained by an artificial or natural decomposition of cellulose is guaranteed.

This invention provides a continuous process of fermentation in place of the known discontinuous process.

The process according to this invention is carried out by leading, for instance, industrial sugar solutions through yeast or other ferment filters arranged in closed vessels which are in communication with one another. The filter is formed by suitably fixing the yeast or other ferment on suitable supports, for instance on diatomaceous earth (kieselguhr), saw-dust, wood-shavings or similar fabric. Yeast or other ferment thus prepared is placed in each of the fermentation vessels.

In the accompanying drawing a suitable apparatus for carrying out my process is diagrammatically illustrated.

Any suitable number of fermenting vessels may be used but a set of four is here shown, viz: I, II, III, IV arranged in series, one behind the other and communicating with one another by pipes 5, 6, 7, 8, 9 in such a manner, that the liquid to be fermented leaves at the top of one vessel and enters at the bottom of the next. A discharge pipe f is provided through which the fermented liquid is drawn off from the vessel last in the line for the time being. In order to allow the fresh sugar-containing liquid to be introduced into the several vessels in an alternating manner in the series, the conduits are suitably connected as shown on the drawing. The supply conduit e for the liquid to be fermented is provided with cocks 1, 2, 3 and 4 for the corresponding vesesls I, II, III and IV and connected with the branch pipes 5, 6, 7, 8, 9 which latter pipes are directly connected with the respective fermenting vessels, on the one hand, and with the discharge pipe f for the fully fermented liquid on the other hand. The overflow pipes 10, 11, 12 and 13 are provided respectively with three-way cocks a, b, c and d. Depending on their position, these cocks may at one time connect the overflow pipes 10, 11, 12 and 13 with the connecting pipes 6, 7, 8 and 9 for the fermentation vessels I, II, III and IV; or at another time connect these overflow pipes with the discharge pipe f, for the fully fermented liquid.

For instance, if the admission cocks 1, 2 and 4 were closed and 3 open and the three-way cocks a, c, d set for communication between the fermenting vessels through the pipes 6, 8 and 9 and the three-way cock b turned to connect the fermenting vessel II with the discharge pipe f for the liquid, then the lye will take its course in the direction of the arrows from the fermenting vessel III through fermenting vessels IV, I and II and from there to the liquid discharge pipe f. By corresponding setting of the admission and three-way cocks the charging of each vessel I, II, III or IV may be changed as required.

Supposing now the vessels in the series as shown on the drawing, viz: I, II, III, IV with all of the discharge and admission cocks close except admission cock 4, then, in starting the fermentation process, vessel IV would first be charged with fixed yeast and then with fresh sugar solution while all the other vessels are empty. The admission valve 4 is then closed and as soon as the sugar in vessel IV is about one-fourth fermented, vessel III is similarly charged with fixed yeast and with fresh sugar liquor by opening cock 3, and cock 3 is thereupon closed. As soon as the sugar in this vessel is one-fourth fermented, whilst the sugar in vessel IV will consequently be about one-half fermented, the same procedure is followed with regard to vessel II and finally also with vessel I. When thus the entire system of fermentation vessels is filled, the yeast as well as the liquid will be in a different stage of fermentation in each of the four vessels, and the fixed yeast in each vessel will become acclimated to a different strength of sugar solution, that is the yeast cells in each vessel will continue to reproduce themselves and thus thrive and produce fermentation in a sugar solution of a different strength. The three-way cocks a, b, and c are now turned to connect vessels I, II, III and IV in series and after the sugar in vessel I has been one-fourth fermented, the sugar in vessel IV will be fully fermented and the cock d is connected with the discharge pipe f.

The sugar solution to be fermented is caused to flow gradually through the entire battery of vessels, at the temperature of about 20° to 30° C. for instance, and the fermentation increases in each of the vessels reached by the liquid; thus the fermentation will become complete within the last or fourth vessel of the system. The fermented liquid is drawn off the last vessel while simultaneously a corresponding quantity of fresh liquid enters the first vessel of the battery. Particular attention must be given to the regulation of the rate of flow of the liquid to be fermented and it must be such as to suit the circumstances in each case. The direction of flow is maintained constant but the order of entering and leaving the different vessels is altered at certain intervals, for example at every 12 or 24 hours, in order to ensure that the same yeast does not remain a long time in contact with a liquid which is too poor in sugar or is too rich in sugar. Taking the above example, this would be done by emptying vessel IV, introducing fresh unfermented liquor into it and forming a new series in the order IV, I, II and III when discharged will next be made from vessel III. When the fermentative power of the yeast falls off, each vessel may be taken out, supplied with a fresh charge of yeast and connected to be set again without interfering with the progress of the fermentation. The flow of the liquid may be caused for example by pressure or by suction.

Great advantages are derived from this process as regards the size of the plant and cost of running. In the fermentation of sulfite liquor for instance, less than one-fiftieth of the space and a far smaller amount of heat are required than with the known processes. Moreover the thoroughly continuous and automatic process of the operation allows of a great saving of labor and an accurate control of the process. Furthermore, in the fermentation, for example of sulfite liquor, the life of the yeast is almost unlimited and contrary to views held hitherto, degeneration does not occur in spite of the small sugar content of the solution. After a period of activity of eight months the yeast is still entirely pure and vigorous, so that its removal and culture hardly come into consideration.

In the manner described it will be possible to ferment technical sugar solutions, and in particular such solutions as have been derived from saccharification of cellulose-containing substances, and which contain fermentation-resisting ingredients.

What I claim as my invention and desire to secure by Letters Patent of the United States is:—

1. A method of continuous fermentation of technical sugar solutions consisting in conducting the sugar solutions through a plurality of vessels connected in series, each vessel being charged with fixed ferment of different fermenting power.

2. A method of continuous fermentation of sugar solution obtained from decomposed cellulose, consisting in conducting the sugar solutions through a plurality of vessels connected in series, each vessel being charged with fixed ferment in such a manner, that the sugar solution while becoming poorer in its sugar contents comes in contact with ferments of increasing fermenting power.

3. A method of continuous fermentation of sugar solutions consisting in conducting a sugar solution through a plurality of vessels connected in series, each vessel being charged with fixed ferment acclimated to sugar solutions of a different strength.

4. A method of continuous fermentation of sugar solutions consisting in conducting the sugar solutions through a plurality of vessels connected in series, each vessel being charged with fixed ferment of a different fermenting power and being acclimated to a sugar solution of a different strength.

In testimony whereof I have signed my name to this specification in the presence of two subscribing witnesses.

ADOLF RÖMER.

Witnesses:
MAX HOHRER,
MARIA LEUVE.